Dec. 1, 1959 G. W. GOODRICH 2,914,872
MODULAR DISPLAY ARRANGEMENT
Filed Aug. 27, 1957 4 Sheets-Sheet 1

INVENTOR.
GORDON W. GOODRICH
BY
Julian C. Renfro
ATTORNEY

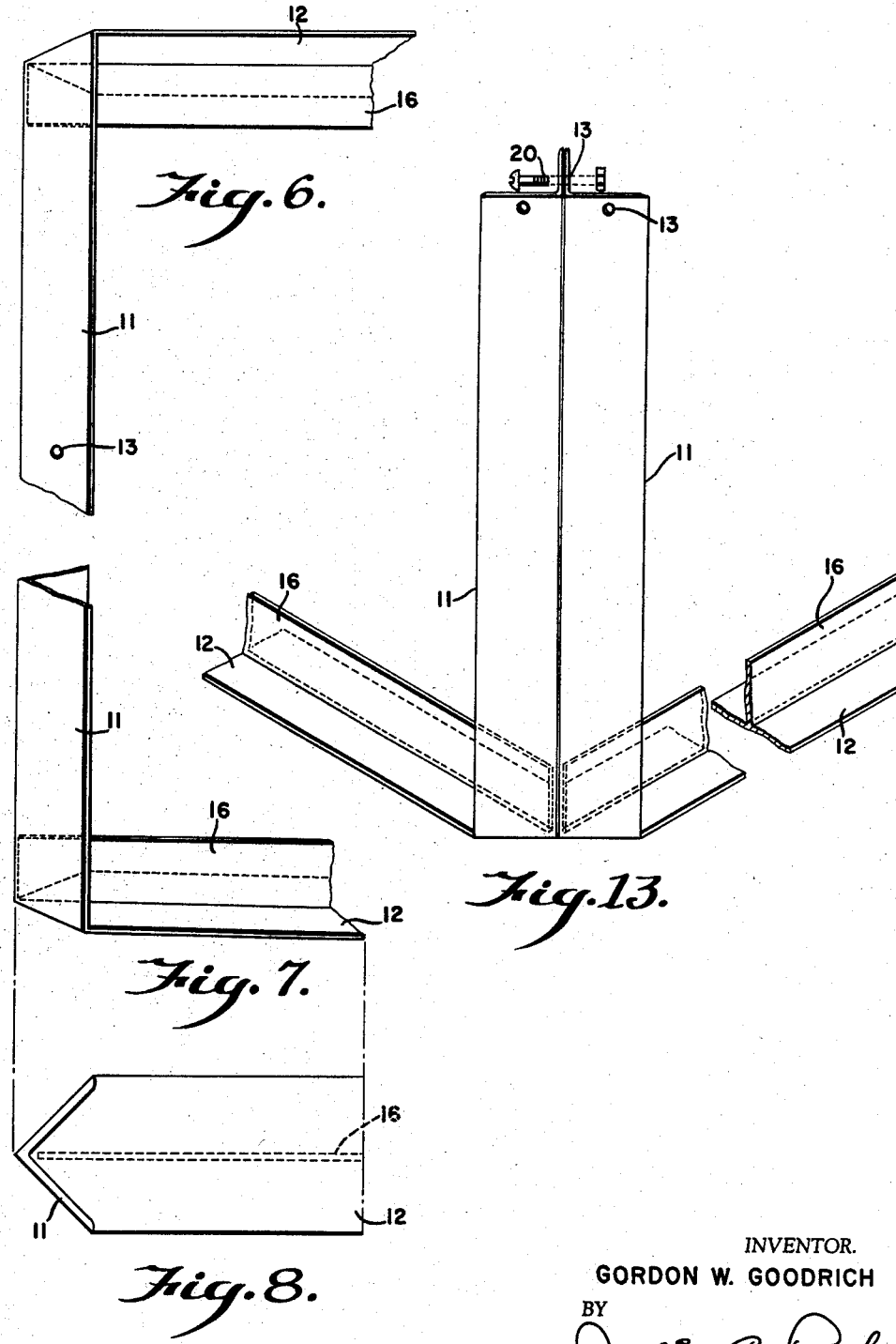

Dec. 1, 1959  G. W. GOODRICH  2,914,872
MODULAR DISPLAY ARRANGEMENT
Filed Aug. 27, 1957  4 Sheets-Sheet 3

INVENTOR.
GORDON W. GOODRICH
BY
Julian C. Rafle
ATTORNEY

Dec. 1, 1959   G. W. GOODRICH   2,914,872
MODULAR DISPLAY ARRANGEMENT
Filed Aug. 27, 1957   4 Sheets-Sheet 4
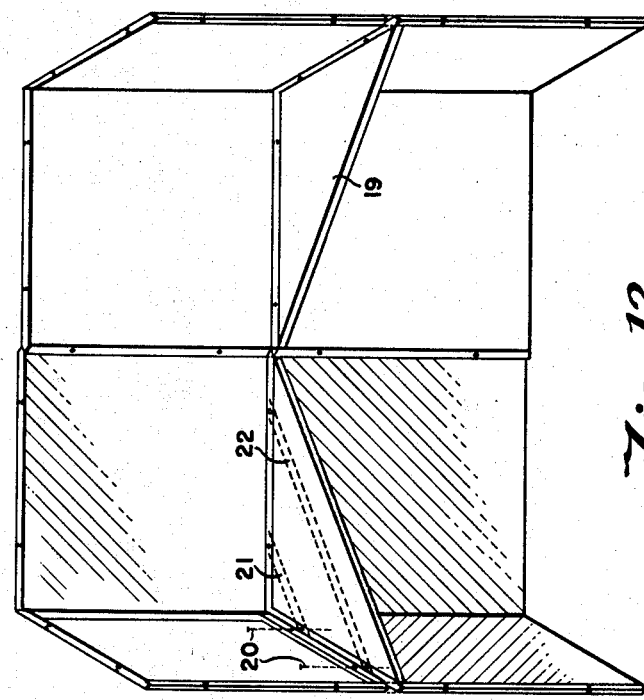
Fig.12.
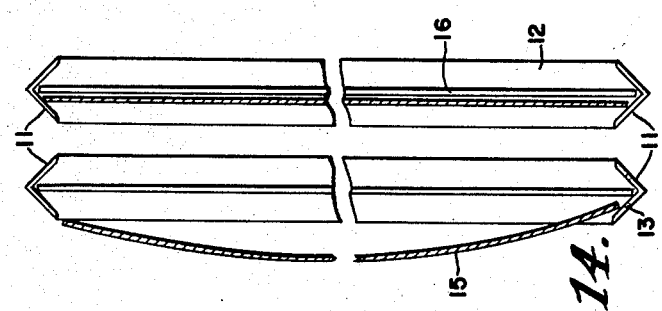
Fig.13.
Fig.14.
Fig.15.
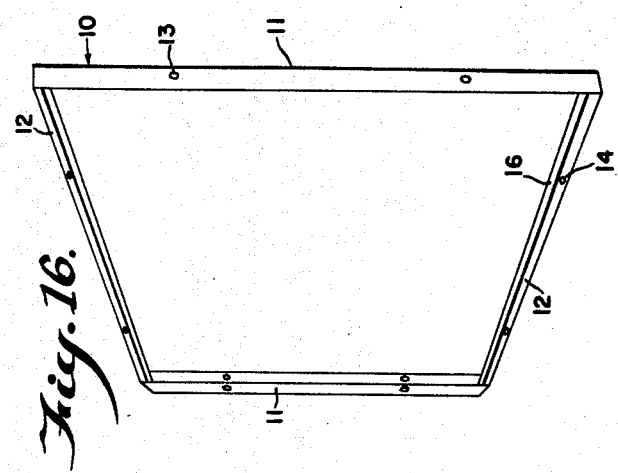
Fig.16.
INVENTOR.
GORDON W. GOODRICH
BY
ATTORNEY United States Patent Office 2,914,872
Patented Dec. 1, 1959

2,914,872

MODULAR DISPLAY ARRANGEMENT

Gordon W. Goodrich, Towson, Md., assignor to The Martin Company, a corporation of Maryland Application August 27, 1957, Serial No. 680,575

5 Claims. (Cl. 40—124)

This invention relates to the field of display, and more particularly to a display arrangement utilizing a modular system of structural frames designed to receive display panels, the frames being adapted to be secured together in a variety of configurations.

In the past a large number of display schemes have been proposed, but in each known instance the display was of a fixed nature and incapable of being changed in its basic configuration without major redesign work being involved. Furthermore, it was a comparatively time-consuming job to change the items illustrated in the display, usually requiring the services of a trained technician.

According to the present invention a basic modular frame is utilized, opposed sides of which define panel receiving slots designed to receive stiff, slightly deformable display panels. A panel is installed in the basic frame by bending slightly so as to diminish somewhat the distance between its ends, positioning it between the slots of the frame and then releasing it so that the inherent stiffness of the panel will cause it to remain in the desired position therein.

The basic frames are advantageously of a construction that permits a plurality of frames to be readily assembled into an exhibit of a desired configuration, and then reused as often as necessary. Appropriate mounting holes or the like are utilized in the sides of the frames so that the frames can be fastened together one alongside another as well as one above the other in the chosen manner. The frames are extremely versatile, making it possible for any number of display unit configurations to be built up in a minimum of time, and the units subsequently equipped with display panels upon which photographs, art work, graphs or the like are mounted. This display system is highly mobile and by separating it into its basic frame units, can be transported by hand or shipped in small packages.

Further features of this invention will be apparent from a study of the accompanying drawings in which:

Figure 6 is a view illustrating a typical upper corner of a frame unit, illustrating the joint formed between a panel receiving member, and a panel positioning member;

Figure 7 is a view similar to Figure 6 but illustrating a typical lower corner of a frame unit in which such a joint appears;

Figure 8 is a plan view illustrating by use of phantom lines the location of a panel positioning member and its relation to a panel-receiving member;

Figure 12 illustrates an exemplary display screen constructed using eight basic frames and two triangular table tops secured together;

Figure 13 illustrates on a somewhat larger scale a typical joint formed between frames joined as in Figure 10;

Figure 14 shows in cross section the manner in which a display panel is bent into a convexity for insertion into the basic frame unit;

Figure 15 shows in cross section the manner in which a display panel resides within a frame unit, being maintained in place therein between opposed angular concavities; and Figure 16 is a perspective view of a typical frame of the type used in accordance with this invention.

Figure 9:
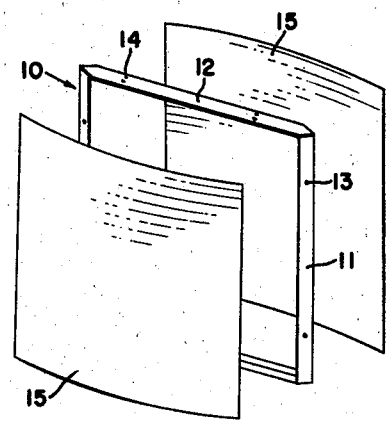
Figure 9 shows a basic frame into the opposite sides of which two display panels are ready to be snapped.
Figure 5:
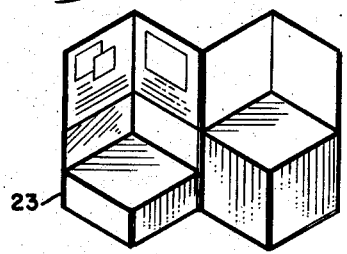

Referring to Figures 1 through 5, various modular display arrangements according to this invention are illustrated, with the basic module of each display being a generally rectangular frame of the type shown in Figures 9 and 16, the details of the frame being shown more particularly in Figures 6 through 8 and 13 through 15. The basic frame 10 preferably consists of a first pair of opposed sides 11 which are of angular cross section, and a second pair of opposed sides 12 which are of T shaped cross section. These sides are preferably of light metal such as aluminum and the corners are secured together such as by welding them in order to form a comparatively rigid frame.

Each frame may for example measure approximately 3 feet on a side, and each side is preferably equipped with uniformly placed mounting holes so that frames may be secured together such as by bolts 20 in order to form the desired type of display. The interior of each side 11 defines panel-receiving slots and the exterior of each side 11 defines two frame-joining surfaces meeting substantially at a 90° angle, with the apex of the angle directed outwardly and disposed substantially in the plane of the panel to be inserted in the slots, as is to be seen in Figure 15. Two or so mounting holes 13 are located in each of said surfaces, so by the use of bolts or other appropriate fasteners it is possible to join sides 11 of adjacent frames at a 90° angle as shown in Figure 1, or at a substantially 180° angle as shown at the mid-joint of the display illustrated in Figure 12.

Figure 3:
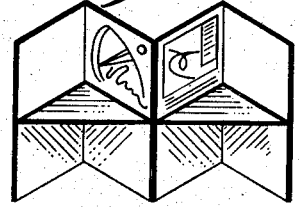
Figure 4:
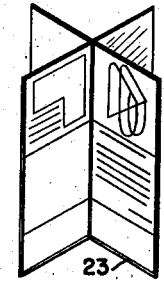

In sides 12, the upper surface of the T shaped section is generally perpendicular to the plane of the frame, and is furnished with mounting holes 14 so that the sides 12 of adjacent frames may be joined together in a common plane as illustrated in Figures 4 and 12. The holes 14 are preferably spaced the same distance apart as holes 13, and this makes possible the joinder of side 11 of one frame to side 12 of an adjacent frame to form a 135° joint instead of a right angle. Furthermore, two vertically spaced series of frames may be bolted together in parallelism as seen in Figure 3, or alternatively bolted together in the manner shown in Figure 2 in which the upper series of frames are shifted horizontally in respect to the lower series.

Referring most particularly to Figures 14 and 15, a display panel 15 is shown in conjunction with a frame 10, this panel being of stiff, slightly deformable material such as cardboard, aluminum or the like, and of a dimension slightly greater than the dimension between the side edges of opposite sides 11 of the frame. The panels are designed to fit in the slots defined on the inner surfaces of the side members 11, and in order that this may be accomplished, the panels are deformable to the position shown in Figure 14 so that they may be inserted under tension into the frame and then retained therein, largely due to the inherent stiffness of the panel. The central portion 16 of each T shaped sides 12 forms panel positioning means, as appear in Figures 13 and 15. As should be apparent from Figures 9 and 15, a panel 15 may be inserted into each side of a frame so that both sides of the resulting display will be capable of being part of the exhibit if this be desired.

Figure 1:
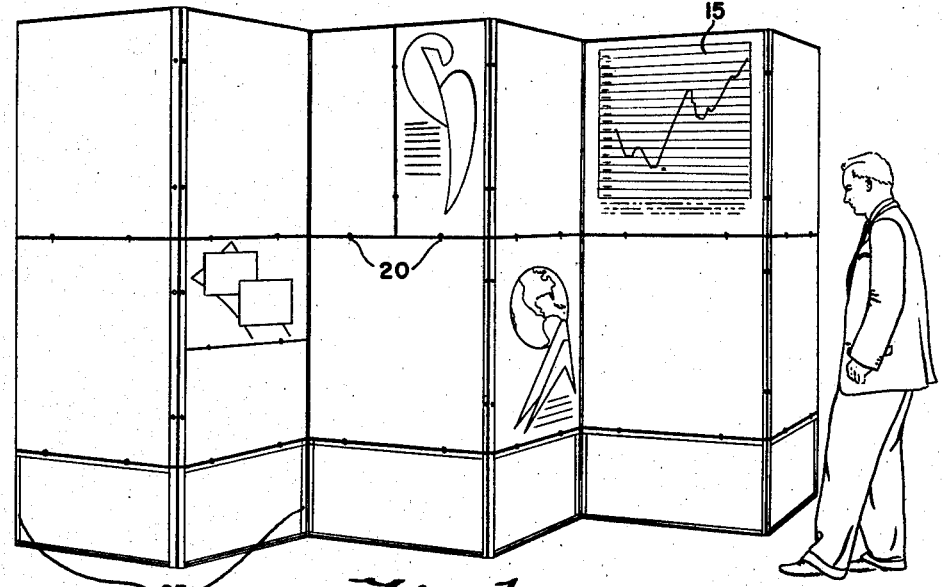
Figures 1 through 5 show various display arrangements made possible utilizing the basic modular frame according to this invention.
Figure 2:
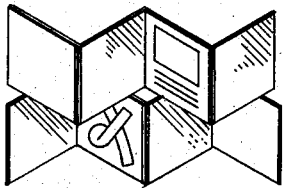
Figures 10, 11:
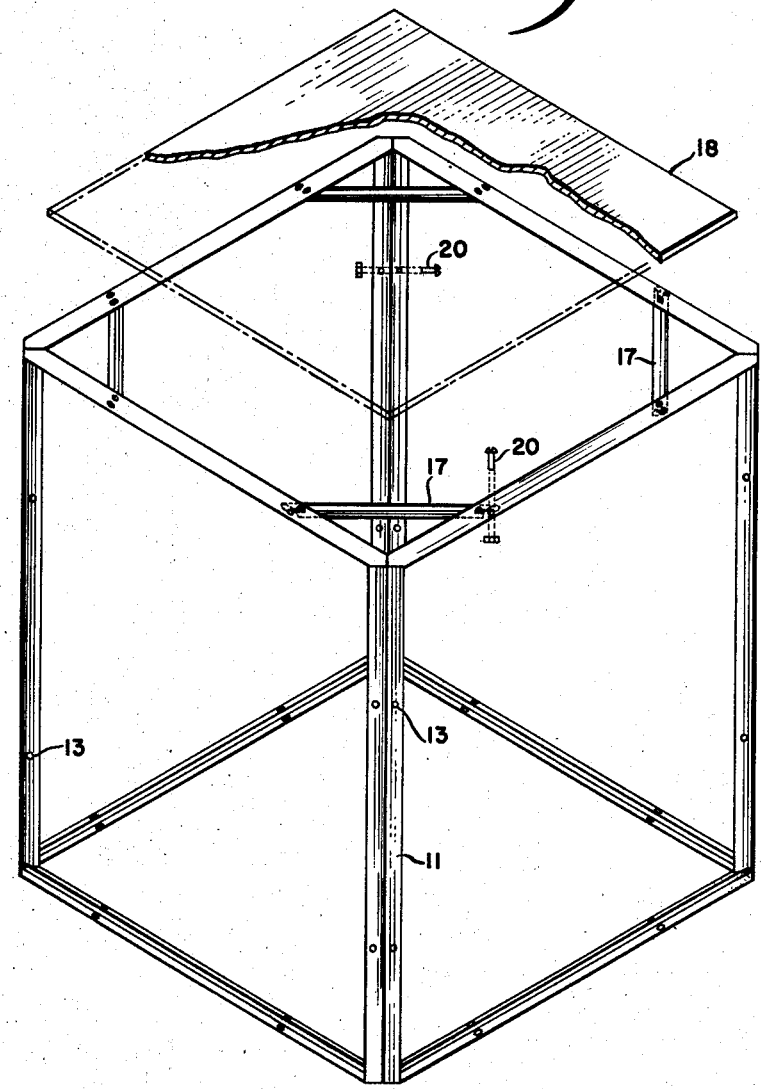
Figure 10 illustrates a table configuration constructed utilizing four basic frame units, and arranged to receive a table top.
Figure 11 illustrates a typical brace used with the table configuration of Figure 10.

The present display arrangement is extremely versatile, and a variety of display panels upon which are mounted photographs, copy, art work, graphs and the like as shown in Figure 1 may be used therewith. These panels can be changed in a very short time by deflecting them to the configuration shown in Figure 14, and then removing them from the frame entirely. New panels upon which different pictorial representations are mounted can be substituted equally rapidly. As shown in Figure 10 the basic frames readily lend themselves for the creation of three dimensional display units. In order to create the display according to this figure, sides 11 of four frames are secured together at 90° angles, and then short braces 17 fastened between adjacent holes 14 in the upper frame members 12 so as to lend rigidity to the box-shaped unit. A square table top 18 may be placed upon the unit so that models or the like may be placed thereon to be viewed by the public.

As shown in Figure 12, other surface-defining arrangements are possible such as by the utilization of triangular table tops 19 supported by appropriate support members 21 and 22 that are preferably bolted into position in holes 14 of the respective frame sides 12.

Display arrangements according to this invention may be formed entirely of the modular frames 10 and the display panels to be inserted therein, or if it be decided that the frames be raised somewhat, half size frames 23 may be additionally used as shown in Figures 1 and 4. These frames 23 are otherwise identical to the basic frames 10 with the exception that the sides of angular cross section are half the usual length. Frames 23 also may be used in other portions of the display as is to be seen in the upper section of the exhibit illustrated in Figure 2.

It is to be understood that the foregoing detailed descriptions and the accompanying drawings are illustrative and that the combinations and improvements herein disclosed may be embodied in various other ways without departing from the invention defined by the claims.

I claim:

1. A display arrangement comprising a plurality of generally rectangular frame units, and stiff, slightly deformable planar display panels of lengths to be mounted in said frames, one pair of opposed sides of each frame defining panel-receiving slots on their inner surfaces, the exterior of each of said opposed sides defining two elongated frame-joining surfaces meeting substantially at a 90° angle, with the apex of each angle directed outwardly, said apices being located substantially in the plane of the display panel to be placed in said slots, the sides of said frames adjacent said one pair of opposed sides being substantially open so as not to interfere with the rapid, broadside insertion of a display panel bent into the form of a convexity and placed with its opposite edges between said panel-receiving slots, but having means to limit movement of a display panel to an aligned position in a frame, and fastening means for securing together the frame-joining surfaces of two adjacent frames whereby said frames can be joined at substantially 90° angles or in substantially planar relationship to create a display in which various display panels may be inserted, said panels being held in the slots of their respective frames as a result of their inherent stiffness, but being aligned with their frames at least partly because of said movement limiting means.

2. The display arrangement according to claim 1 in which said sides adjacent said one pair of sides of each frame each define a single mounting surface along their exterior surface, latter mounting surfaces being perpendicular to the plane of the respective frame, whereby adjacent frames disposed in a common plane may be joined.

3. A display arrangement comprising a generally rectangular frame, one pair of its opposed sides being constructed of angle members that define panel-receiving angular concavities, and the other pair of its opposed sides being formed of members of T-shaped cross section that define alignment means, and a stiff, slightly deformable substantially planar display panel of a length to be received in and extend between said angular concavities in said one pair of opposed sides, said panel being installable in said frame by being bent slightly at the approximate midpoint so as to diminish somewhat the distance between one pair of its opposed side edges, and then being positioned between said angular concavities in such a manner that upon being released, the panel returns to planar shape with the side edges adjacent said one pair of opposed side edges of the panel moving unopposed into contact with said alignment means, the central portion of each T serving to limit movement of said panel, and thereby facilitate proper positioning of said panel in said frame.

4. A display arrangement comprising a plurality of generally rectangular frame units, one pair of opposed sides of each unit defining panel-receiving angular concavities, and the other pair of opposed sides of each unit having alignment means therein, said frame units being provided with fastening means so that said units can be fastened together one alongside another as well as one above the other to form a desired type of display in which at least two lower frame units thereof in contact with a supporting surface are in angular relation with each other to provide stability for said display arrangement, and stiff, slightly deformable display panels for said units, being of lengths to be received in and extend between said angular concavities in said opposed frame sides and to be aligned in said frame at least partly because of said alignment means, said panels being installed in said frames by being bent slightly so as to diminish somewhat the distance between their ends, and then being positioned substantially simultaneously between the angular concavities of the frame, the inherent stiffness of said panels facilitating their retention in the angular concavities of their respective frames, said angular concavities being defined by angle members, and said alignment means being formed by members of T-shaped cross section, the central portion of each T serving to limit movement of a panel being inserted into said frame.

5. A display arrangement comprising a plurality of generally rectangular frame units, one pair of opposed sides of each unit defining panel-receiving angular concavities, and the other pair of opposed sides of each unit having alignment means therein, said frame units being provided with fastening means so that said units can be fastened together one alongside another as well as one above the other to form a desired type of display in which at least two lower frame units thereof in contact with a supporting surface are in angular relation with each other to provide stability for said display arrangement, and stiff, slightly deformable display panels for said units, being of lengths to be received in and extend between said angular concavities in said opposed frame sides and to be aligned in said frame at least partly because of said alignment means, said panels being installed in said frames by being bent slightly so as to diminish somewhat the distance between their ends, and then being positioned substantially simultaneously between the angular concavities of the frames, the inherent stiffness of said panels facilitating their retention in the angular concavities of their respective frames, the external configuration of each of said one pair of opposed sides of each frame unit forming two abutting mounting surfaces set at an angle of approximately 90° to each other, said mounting surfaces each bearing a relation of approximately 45° to the plane of said frame unit, the external shape of said other pair of opposed sides of each frame unit forming a mounting surface at approximately 90° with respect to the plane of said frame unit, whereby two adjacent frame units may be joined at either 90° or 180° by securing two angularly-disposed mounting surfaces together, or joined at 135° by securing an angularly-disposed mounting surface of one frame unit to a mounting surface set at 90° with respect to the plane of the other of said frame units.

References Cited in the file of this patent

UNITED STATES PATENTS

| | | |
|---|---|---|
| 1,359,659 | Beans | Nov. 23, 1920 |
| 1,468,198 | Dunn | Sept. 18, 1923 |
| 1,891,963 | Weber et al. | Dec. 27, 1932 |
| 2,176,713 | Hendrix | Oct. 17, 1939 |
| 2,559,106 | Bishop et al. | July 3, 1951 |

FOREIGN PATENTS

| | | |
|---|---|---|
| 58,804 | Austria | Apr. 25, 1913 |
| 744,591 | France | Jan. 26, 1933 |